United States Patent
Scrivano

(10) Patent No.: US 11,210,269 B2
(45) Date of Patent: Dec. 28, 2021

(54) SYSTEM AND METHOD FOR DEDUPLICATING CONTAINER IMAGE STORAGE DATA

(71) Applicant: Red Hat, Inc., Raleigh, NC (US)

(72) Inventor: Giuseppe Scrivano, Spezzano della Sila (IT)

(73) Assignee: RED HAT, INC., Raleigh, NC (US)

( * ) Notice: Subject to any disclaimer, the term of this patent is extended or adjusted under 35 U.S.C. 154(b) by 228 days.

(21) Appl. No.: 15/895,727

(22) Filed: Feb. 13, 2018

(65) Prior Publication Data

US 2019/0251190 A1  Aug. 15, 2019

(51) Int. Cl.
*G06F 16/174* (2019.01)
*G06F 3/06* (2006.01)
*G06F 16/16* (2019.01)

(52) U.S. Cl.
CPC ........ *G06F 16/1748* (2019.01); *G06F 3/0608* (2013.01); *G06F 3/0641* (2013.01); *G06F 3/0643* (2013.01); *G06F 3/0665* (2013.01); *G06F 3/0673* (2013.01); *G06F 16/162* (2019.01)

(58) Field of Classification Search
CPC ... G06F 16/162; G06F 16/1748; G06F 3/0641
See application file for complete search history.

(56) References Cited

U.S. PATENT DOCUMENTS

| | | | |
|---|---|---|---|
| 9,454,537 B2 | 9/2016 | Prahlad et al. | |
| 9,569,455 B1 | 2/2017 | Bono et al. | |
| 2006/0047662 A1* | 3/2006 | Barik | G06F 21/6227 707/999.01 |
| 2012/0066762 A1* | 3/2012 | Todorovic | G06F 21/53 726/22 |
| 2013/0054540 A1* | 2/2013 | Factor | G06F 16/1752 707/692 |
| 2014/0201170 A1* | 7/2014 | Vijayan | G06F 11/1453 707/692 |
| 2017/0269978 A1 | 9/2017 | Engel et al. | |
| 2017/0286230 A1 | 10/2017 | Zamir | |

(Continued)

OTHER PUBLICATIONS

Day, Stephen. "Extensibility." Open Container Initiative, Jun. 21, 2017, github.com/opencontainers/image-spec/blob/master/considerations.md.

(Continued)

*Primary Examiner* — Kannan Shanmugasundaram
(74) *Attorney, Agent, or Firm* — Haynes and Boone, LLP

(57) ABSTRACT

Systems and methods are included for matching a file's checksum to a file path and creating a link in a container image repository to the file at the file path, according to aspects of the present disclosure. A first container image layer comprising one or more files is received. Then, a first file of the one or more files from the first container image layer is extracted. A checksum of the first extracted file is determined, and the checksum is matched to a file path which includes the checksum, wherein the file path is associated with a second file accessible to a first container image repository via the file path. Responsive to the matching, a link to the second file is created in a second container image repository using the file path.

20 Claims, 4 Drawing Sheets

(56) References Cited

U.S. PATENT DOCUMENTS

2018/0165080 A1* 6/2018 Dimitrov .................. G06F 8/60

OTHER PUBLICATIONS

Anderson, Melissa. How To Share Data between the Docker Container and the Host. DigitalOcean™ Inc., Dec. 21, 2017, www.digitalocean.com/community/tutorials/how-to-share-data-between-the-docker-container-and-the-host.
Karle, Akshay. "Operating System Containers vs. Application Containers." Edited by Gabor Nagy, Node.js Tutorials for Beginners, RisingStack, May 19, 2015, blog.risingstack.com/operating-system-containers-vs-application-containers/.
"Related Projects." OSTree, Libostree, ostree.readthedocs.io/en/latest/manual/related-projects/.
Day, Stephen. "Extensibility." Open Container Initiative , Jun. 22, 2017, github.com/opencontainers/image-spec/blob/master/considerations.md.

* cited by examiner

SYSTEM AND METHOD FOR DEDUPLICATING CONTAINER IMAGE STORAGE DATA

FIELD OF DISCLOSURE

The present disclosure generally relates to data processing, database and file management or data structures, and more particularly to data storage.

BACKGROUND

Containers are lightweight mechanisms for isolating running processes so that they are limited to interacting only with their designated resources. Many application instances can be running in containers on a single host without visibility into one anothers' processes, files, network, and so on. Typically, each container provides a single service (often called a "micro-service"), such as a web server or a database, though containers can be used for arbitrary workloads.

Containers may be used to ensure consistency across multiple development environments. For example, software applications may be packaged into container images that include collections of objects and metadata. An image is a binary that includes all of the requirements for running a container, as well as metadata describing its needs and capabilities. Images, which may be read-only, may contain files such as packages, scripts, libraries, settings, etc. These files allow the image to be run as a standalone application in a container.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: receiving a first container image layer including one or more files; extracting a first file of the one or more files from the first container image layer; determining a checksum of the first extracted file; matching the checksum to a file path which includes the checksum, the file path associated with a second file accessible to a first container image repository via the file path; and responsive to the matching, creating a link in a second container image repository to the second file using the file path. Other examples of this aspect include corresponding computer systems, apparatus, and computer programs recorded on one or more computer storage devices, each configured to perform the actions of the methods.

One general aspect includes a method including: receiving a first container image layer including one or more files; extracting a first file of the one or more files from the first container image layer; determining a checksum of the first extracted file; matching the checksum to a file path which includes the checksum, the file path associated with a second file accessible to a first container image repository via the file path; and responsive to the matching, creating a link in a second container image repository to the second file using the file path. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: receiving a first container image layer including one or more files; extracting a first file of the one or more files from the first container image layer; determining a checksum of the first extracted file; matching the checksum to a file path which includes the checksum, the file path associated with a second file accessible to a first container image repository via the file path; and responsive to the matching, creating a link in a second container image repository to the second file using the file path. Other examples of this aspect include corresponding computer systems, apparatus, and computer programs recorded on one or more computer storage devices, each configured to perform the actions of the methods.

DETAILED DESCRIPTION

Figure 1:
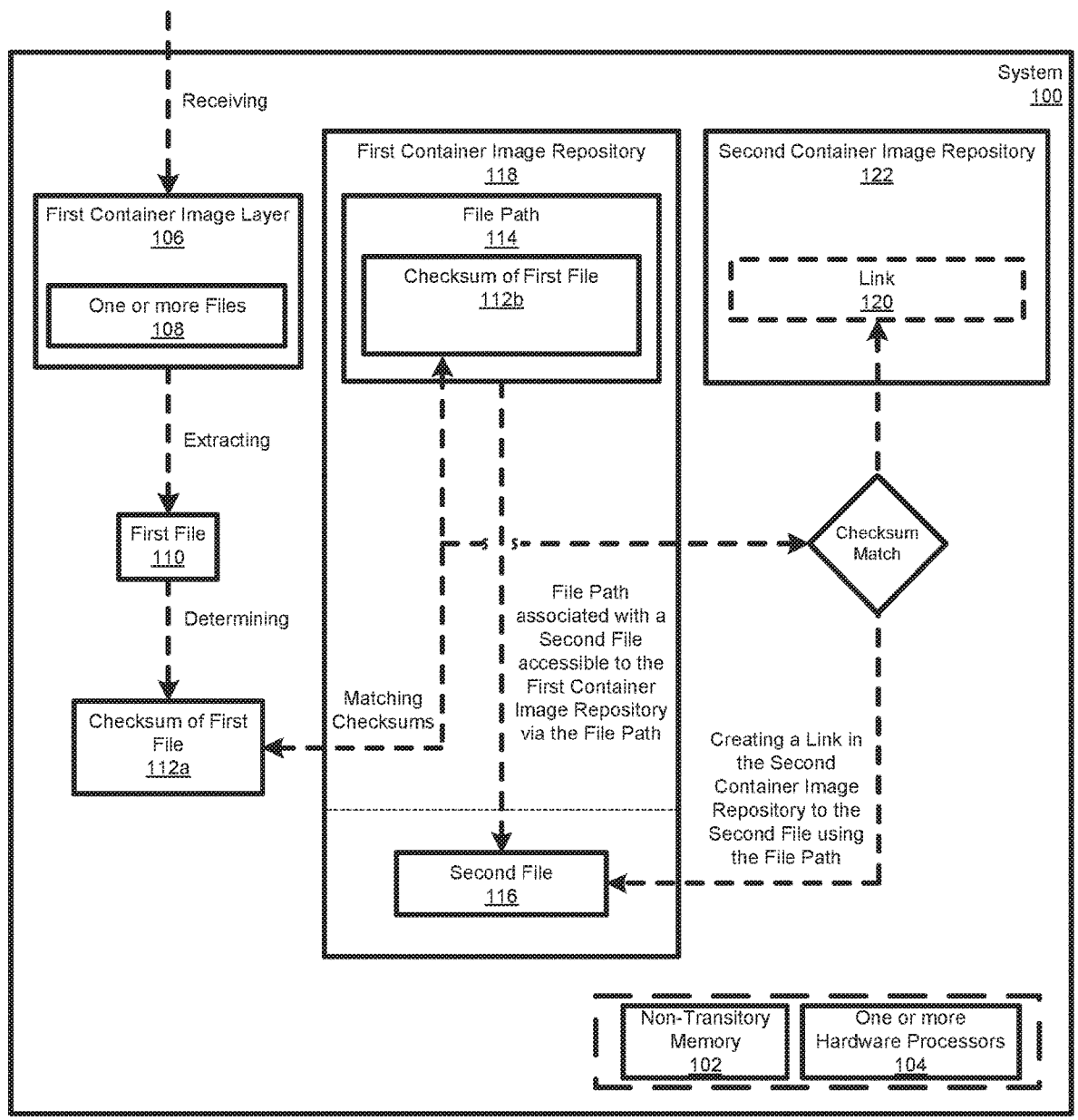
FIG. 1 is an organizational diagram illustrating a system for matching a file's checksum to a file path and creating a link in a container image repository to the file at the file path, according to aspects of the present disclosure.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

As a result of the boom in containerized services and applications, the accompanying surge in demand for container image storage has put a strain on existing storage capacities. Images may be stored in registries, repositories, or other such places where images are collected and stored. Image repositories may be hosted on the internet and made accessible to a computer system via a network interface. Repositories may also exist locally, as when images are downloaded or pulled to a local data storage device, such as a hard drive. Images may also be organized in layers. A layer may be comprised of one or more files, and the files may be archived and compressed. To use the files, the files may need to first be extracted, which may involve dearchiving and/or decompressing the files.

Processing and storing such large quantities of data has led to rising costs both for data centers and end users. Ultimately, data center costs are passed onto the consumer in the form of increased fees. Running larger data centers also consume more energy, more land, more natural resources, and more manpower. To reduce such costs, what is needed is a system and method to make container image storage more efficient. For example, container image storage may be made more efficient if multiple container images which require access to a file in common could all be made to use the same, single file, instead of duplicating the file in each image or each image layer. Another way to more efficiently store image files would be to ensure that duplicate files are not created—or if they are, that they are removed-when different layers in the same image are built using the same file. Particularly for container images, the same file can be present in multiple layers and stored separately on the file system.

Various examples described herein provide techniques for making container image storage more efficient. As a high-level overview, the techniques include extracting files from a container image layer, and using a checksum of the extracted file to determine if the file already exists on a container image repository. If so, a link to the file is created in the same or other container image repository (instead of duplicating the file in the other container image repository).

In more detail, a container image layer may be extracted to a data storage location of a data storage device such as a storage file path of a network data storage device or a local data storage device. For example, if a first container image layer is "layer1.gz," then the extracting may include decompressing and/or dearchiving "layer1.gz" into its respective files. The files may be extracted into a local data storage device such as a local hard drive, or onto a network data storage device such as a hard drive accessible via a local area network (LAN) or the internet.

Before, during, or after the file is extracted the checksum of the file is determined. The checksum may be the output of a hash algorithm, and may be an alphanumeric string of text such as "18anxha482hjk." The checksum of each file is unique. In some examples, the file is extracted to a file path not associated with an image repository, for example "/var/lib/containers/storage/wmapp/layer1/." Additionally or alternatively, the file path of the extracted file may also include the checksum. For example, the file may be extracted to the file path, "/var/lib/containers/storage/18anxha482hjk/."

The checksum of the extracted file is compared or matched against a file path which includes the checksum. For example, the file path "/var/lib/containers/storage/os-tree/os-svcs/18anxha482hjk," which is in an Operating System Services repository contains the checksum "18anxha482hjk." Thus, the checksum of the extracted file matches the checksum of the file path. The file path is associated with a second file which is accessible to a first container image repository via the file path. For example, referring to FIG. 3, the second file may be the "18anxha482hjk" file in the file path of the Operating System Services repository, and the "first container image repository" could be the Operating System Services repository.

After a match is determined, a link is created in a second container image repository to the second file using the file path. For example, a link could be created in an Applications repository pointing to the "18anxha482hjk" file in the file path of the Operating System Services repository. In some examples, the first and second repositories could be the same repository, such as when multiple different images or layers in the same repository require access to the same file. Additionally, multiple links may be created at each image or layer in the repository.

The techniques herein provide useful advantages and improvements to the functioning of a computer system. For example, by linking instead of multiplicatively duplicating files used by multiple container images, the efficiency of data storage is improved. As a result, consumers may be able to save money by optimizing their existing data storage devices, rather than adding data storage capacity. Data centers may do the same on a larger scale, leading to significant improvements in energy efficiency, land use, resource consumption, and manpower, as less servers may need to be deployed.

The techniques also provide an unconventional way of organizing files by using file paths including a checksum. Conventionally, file paths correspond to a file name, image name, application name, etc., which makes it easier for users to locate files by searching for the names normally associated with those files. Using checksums or alphanumeric hashes may slow down conventional searching, but the techniques described herein take advantage of a checksum's inherent randomness and lack of relevance to a conventional name of any particular file, image, application, etc., to conduct more efficient searching.

FIG. 1 is an organizational diagram illustrating a system 100 for matching a file's checksum to a file path and creating a link in a container image repository to the file at the file path, according to aspects of the present disclosure.

The system 100 includes a non-transitory memory 102 and one or more hardware processors 104 coupled to the non-transitory memory 102. In the present example, the one or more hardware processors 104 executes instructions from the non-transitory memory 102 to perform operations for: receiving a first container image layer 106 comprising one or more files 108; extracting a first file 110 of the one or more files 108 from the first container image layer; determining a checksum 112a of the first file 110; matching the checksum 112a to a file path 114 including the checksum 112b, the file path 114 associated with a second file 116 accessible to a first container image repository 118 via the file path 114; responsive to the matching, creating a link 120 in a second container image repository 122 to the second file 116 using the file path 114.

In the present example, the first container image layer 106, the first file 110, the first container image repository 118, and the second container image repository 122 are depicted located on the system 100, however they may also be located on different computing devices communicatively coupled to the system 100.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output components such as a keyboard, mouse, touch interface, and/or camera that process(es) user actions such as key presses, clicks, taps, and/or gestures and sends a corresponding signal to the bus or other communication mechanism. The I/O component may also include an output component such as a display.

In some examples, a user may use the I/O component to command the system 100, via a user interface such as a graphical user interface, a command line interface, or any other interfaces a user may use to communicate with system 100, to pull, download, transfer, or otherwise receive a first container image layer 106 containing one or more files 108. For example, the user may pull an image from a container image registry or repository. The image registry or repository may be located locally to the system 100, or be accessible to the system 100 via a network, such as the internet. The container image may be comprised of one or more layers, including a first container image layer 106. The first container image layer 106 may in turn be comprised of one or more files 108.

The system 100 receives the image layer 106. In some examples, the image layer 106 is received via a bus. In other examples, the image layer 106 is received from a network. Generally, a transceiver or network interface transmits and receives signals between electronic devices via a communications link to a network. The network may be a local area network (LAN), wireless LAN (WLAN), public switched telephony network (PTSN), and/or various other wired or wireless networks, including telecommunications, mobile, and cellular phone networks, the internet, a cloud, a peer-to-peer sharing network, and/or any combination of networks thereof that is capable of interconnecting computing devices and/or computer programs. In some examples, the transmission is wireless, although other transmission media and methods may also be suitable.

A first file 110 is extracted from the one or more files 108. Extraction may include dearchiving, decompression, or both dearchiving and decompression. The one or more files 108 may be in any format, including archived or compressed or archived and compressed formats. For example, the one or more files 108 may be of type .gz, .bz, .tar, .zip, .rar, etc. The one or more files 108 may also be in an unarchived, uncompressed, or both unarchived and uncompressed state. The first file 110, which is extracted from the one or more files 108, may be in any unarchived and uncompressed format. In some examples, however, the first file 110 is in an archived and/or compressed format. The first file 110 may be extracted to a local storage device (such as a flash drive), to a network storage device (such as a wirelessly connected hard disk), a network storage location (such as a cloud server), or to a combination of local and network storage locations and devices.

The first file 110 includes a checksum 112a, which is a unique text string that may be used to identify a file. For example, MD5 (Message Digest 5) and SHA (Secure Hash Algorithm) may be used to generate a checksum or a hash value, which may be used to verify files. Sums such as MD5 sums are multi-bit character strings (or hashes) which are made up of numbers and letters. Hashes are generated by running the sum's hashing algorithm against a file. Owing to the long bit-length, hashes are almost always unique, and remain unchanged for the same file even if another machine performs the hashing. Since the generated sum is virtually unique, the generated sum can be used as a checksum to check digital data integrity by verifying that one file is a bit-for-bit copy of another.

In some examples, the checksum 112a of the first file 110 is compared or matched against a file path 114 which includes a checksum 112b. For example, the file path may be "/var/lib/containers/storage/ostree/apps/sa1j6k8d4sa1c" or "/var/lib/containers/storage/ostree/os-svcs/41s32dfw1979." In this example, the first file path points to an "apps" or Applications repository, while the second file path points to an "os-svcs" or Operating System Services repository. Also in the example, the checksum (which may be abbreviated) included in the first file path is "sa1j6k8d4sa1c," while that of the second file path is "41s32dfw1979." Thus, if a file's checksum is "41s32dfw1979," the file's checksum would match with the checksum of the second file path in the Operating System Services repository. While the checksums of the file paths shown in this example are shown abbreviated to around 13 characters, the checksums may be abbreviated longer or shorter.

Generally, file paths are associated with files. In the example above, the first file path may be associated with a file bearing the "sa1j6k8d4sa1c" checksum. By the same nomenclature, the second file path may be associated with a file bearing the "41s32dfw1979" checksum. In some examples, the checksum 112a matches the checksum 112b, which implies that the checksum of the first file matches the checksum of a second file 116 corresponding to the checksum 112b. Or, in other words, the newly extracted first file 110 is a duplicate of the second file 116. The specificity of the match, or the matching criteria, may be determined by default settings in an operating system of system 100 or be specifically programmed by the user. For example, a system default setting might be a checksum match where the checksums are at least thirteen characters long. However, the user may change the default setting to require a file name match, a storage location match, a date modified match, a date range match, etc., in addition to a checksum match. The user may also require a shorter or longer checksum match, for example a checksum match of between one and one hundred characters long.

The second file 116 may be stored in any of the locations to which the first file may be extracted, e.g., locally on the system 100, or remotely on a storage device communicatively coupled to the system 100, on a cloud server, etc. The second file 116 may be included in a first container image repository 118, such as the Operating System Services repository earlier described, a second container image repository 122, or be located or stored elsewhere. Examples of a second container image repository 122 include the Applications repository earlier described, the Operating System repository earlier described, and the unclassified image storage repository earlier described (e.g., "/var/lib/containers/storage/"). In some examples, the second file 116 includes the file data, while in other examples, the second file 116 includes a link to a third file which may include the file data.

When the checksum 112a of the first file 110 and the checksum 112b of the second file 116 match (which matching may be determined by a matching criteria), a link may be placed in a container image repository. For example, if the first file 110 were extracted from an application image or associated with an application image, then a link may be placed in an Applications repository. Similarly, if the first file 110 were extracted from an operating system image, then a link may be placed in an Operating System repository, so on and so forth.

While FIG. 1 shows that the first container image repository 118 is different from the second container image repository 122, and a link 120 is located in a different repository than where the second file 116 is located, the link 120 may also be located in the same repository as the location of the second file 116. For example, if the first file 110 were associated with a first application image, but the second file 116 associated with a second application image was already located in the Applications repository, a link accessible and corresponding to the second file 116 may still be created in the Applications repository to allow the first application image to access the second file 116. Similarly, if one or more layers within the same image in the same image repository required access to the second file 116, a link 120 may be placed in the one or more layers pointing to the second file 116, even if the links 120 were placed in the same repository. Thus, link 120 may be used to prevent unnecessary duplication of the data of the second file 116 in the same or different repositories.

Figure 2:
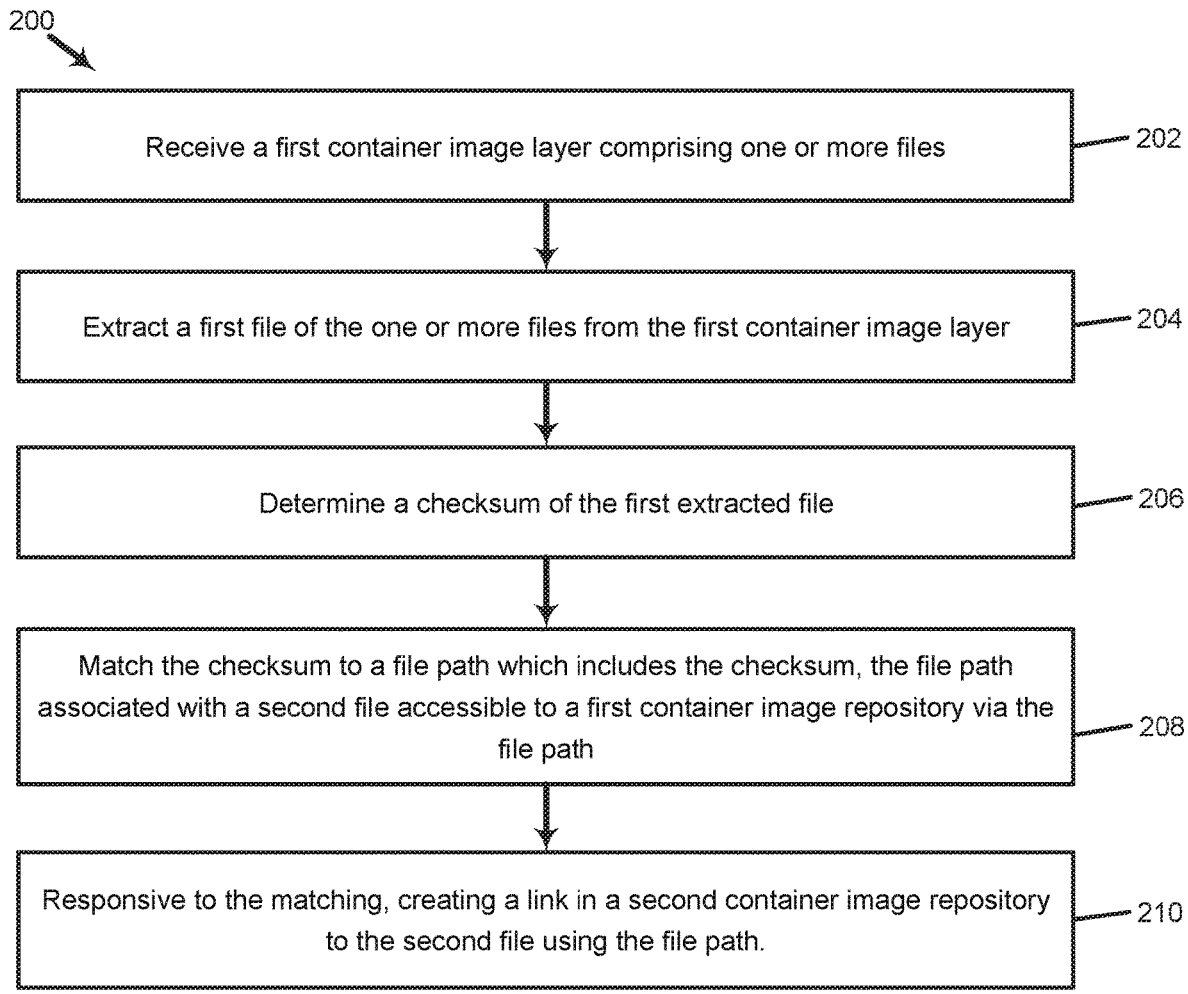
FIG. 2 is a flow diagram illustrating a method for matching a file's checksum to a file path and creating a link in a container image repository to the file at the file path, in accordance with various examples of the present disclosure.

FIG. 2 is a flow diagram illustrating a method for matching a file's checksum to a file path and creating a link in a container image repository to the file at the file path, in accordance with various examples of the present disclosure. The method 200 may be performed by non-transitory memory and processors. The non-transitory memory and processors may be provided, for example, by the system 100 described with respect to FIG. 1. Additional steps may be provided before, during, and after the steps of method 200, and some of the steps described may be replaced, eliminated and/or re-ordered for other examples of the method 200. For example, prior to the steps of method 200, a user may select and pull images from a container image repository, or images may be pulled as part of an update or build command entered into a container application. Method 200 may also include additional steps, such as deleting the extracted file after the link is created. Method 200 may be performed, for example, in combination with the steps of method 400 described with respect to FIG. 4. Method 200 may also be performed using one or more container image layers 314 and 318 in an expanded state, and other elements described with respect to FIG. 3. In some examples, method 200 may be performed by one or more computer systems described with respect to FIG. 1, acting in concert or individually.

At action 202, a first container image layer comprising one or more files is received. The image layer may contain any number of files, and the files may be in any format.

At action 204, a first file of the one or more files of the container image layer is extracted. Any number of files may be extracted, and the files may be extracted to any location, including a temporary storage area of a local disk. The temporary storage area may be periodically purged to remove unused extracted files. The period may be fixed (e.g., every day, every week, every month, etc.), event-based (e.g., when temporary storage consumes a certain storage amount or proportion of storage), or dynamic (e.g., maximum temporary storage capacity may increase or decrease depending on usage of the rest of the storage).

At action 206, a checksum of the first extracted file is determined. The checksum can be determined using any suitable algorithms, such as the MD5 hashing algorithm described with respect to FIG. 1.

At action 208, a match is performed to match the checksum of the first extracted file to a file path which includes the checksum, the file path associated with a second file accessible to a first container image repository via the file path. The checksum may be of any length, and the matching may be performed using any matching criteria, including those described with respect to FIG. 1.

For example, the checksum of the first file may be "18anxha482hjk." Then, a matching file path may be "/var/lib/containers/storage/ostree/os-svcs/18anxha482hjk." The file associated with the file path (e.g., "/var/lib/containers/storage/ostree/os-svcs/18anxha482hjk") may be referred to as a target file or a "second" file, since it may be any file but the first extracted file. The second file is therefore a file that exists before the extracted the file, and in some examples, the second file may be located in a second container image repository. In other examples, the second container may be a parent of the first container image repository. In further examples, the second file may be located in some other location that is not the first or second container image repositories.

For example, the second file may be a file with the checksum "18anxha482hjk" located in the file path "/var/lib/containers/storage/ostree/os-svcs/18anxha482hjk."

Referring to the example file path above, the second file may be accessible to a first container image repository (e.g., the Operating System Services repository) by virtue of the second file's location in the repository. However, the second file need not be located in a particular repository to be accessible to that registry. The second file may also be accessible to a container image repository via links, such as hard links, soft links, symbolic links, aliases, or any other type of link including network links. For example, a hard link pointing to the second file may be placed in an image repository to grant the image repository access to the second file.

At action 210, responsive to the matching, a link is created in a second container image repository (e.g., the Applications repository) to the second file using the file path. Referring to the examples above, a link to the file with the checksum "18anxha482hjk" may be placed in the Applications repository using the file path "/var/lib/containers/storage/ostree/os-svcs/18anxha482hjk". The link may be a file containing metadata identical to the extracted file or the linked file, such as an identical file name, but which may not contain the data "payload" of the extracted file or the linked file. The data "payload" may refer to data other than metadata of a file, i.e., the data contents of the file and not the information about the file.

Further to action 210, the data of the matching extracted file may be deleted, and a link created in the extraction location (e.g., storage repository) pointing to the second file at the file path. Still further, a container image may be built using the second file accessed via any of the created links.

Figure 3:
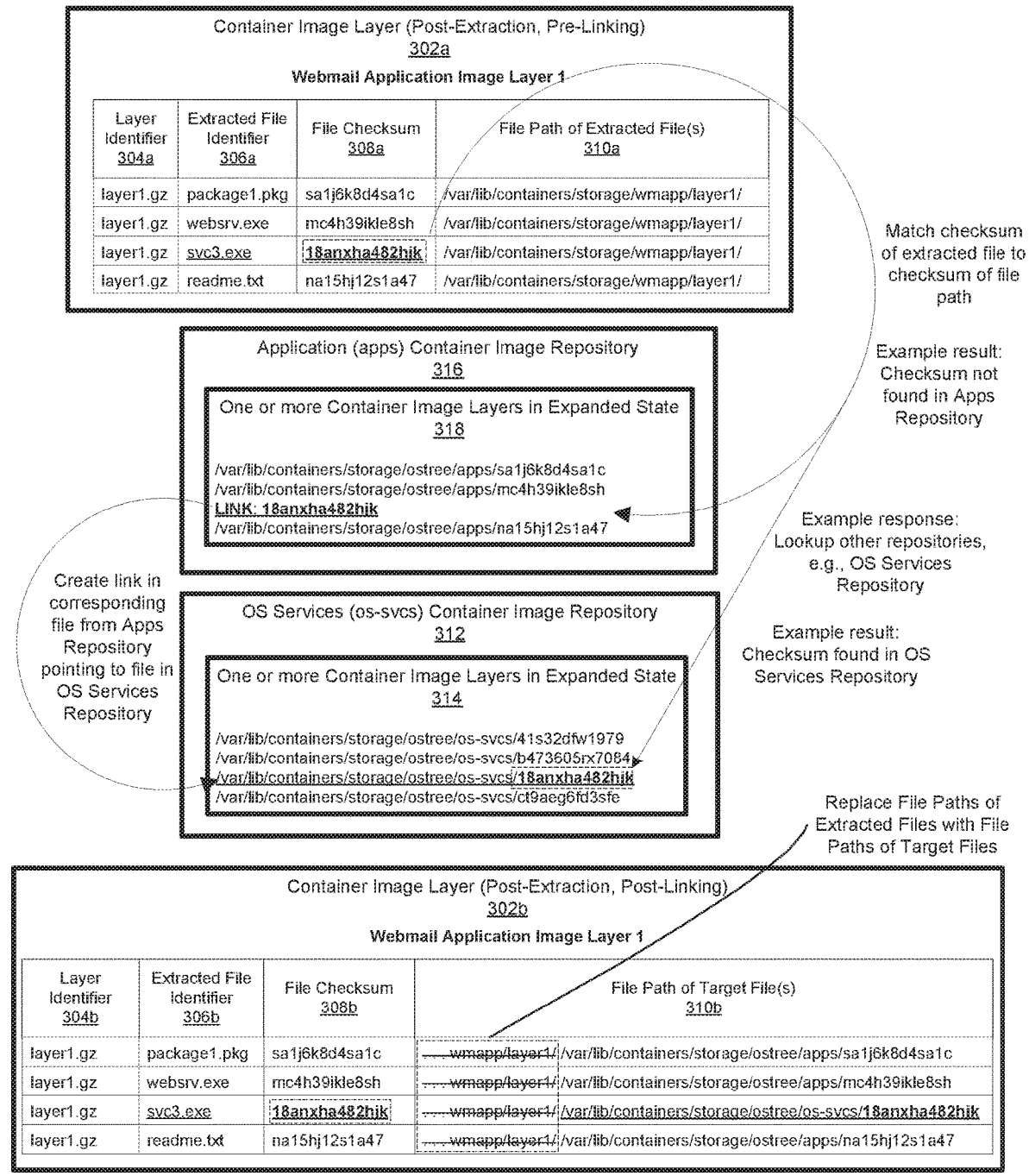
FIG. 3 illustrates diagrammatic representations of: i) a container image layer in a state where its files have been extracted but before a link to a target file has been created; ii) a container image repository for applications; iii) a container image repository for operating system services; and iv) a container image layer in a state where its files have been extracted and a link to a target file has been created.

FIG. 3 illustrates diagrammatic representations of: i) a container image layer in a state where its files have been extracted but before a link to a target file has been created; ii) a container image repository for applications; iii) a container image repository for operating system services; and iv) a container image layer in a state where its files have been extracted and a link to a target file has been created.

Generally, data storage devices include operating systems and file systems (e.g., LINUX). A file system organizes data using files, and the files may be located using file paths. Some of these file paths may be associated with a container image repository. For example, a data storage device may include a container image repository for Operating System, a container image repository for Operating System Services, and a container image repository for Applications. The file path for each of these repositories may be as follows: /var/lib/containers/storage/ostree/os/ (Operating System Repository); /var/lib/containers/storage/ostree/os-svcs/ (Operating System Services Repository); /var/lib/containers/storage/ostree/apps/ (Applications Repository).

The various image repositories may include images, and the images may include one or more layers in an expanded or exploded state. In some examples, the image layers and their associated files may be in an unarchived and/or uncompressed state. In some examples, the image layers and their associated files may be in an archived and/or compressed state. For example, container image layer "layer1.gz" as identified by layer identifier 302a is an image layer in a state where its files have been extracted but before a link to a target file has been created. The one or more layers 318 in an expanded state may be wholly comprised of fully extracted files, i.e., files that are unarchived and uncompressed. In some examples, the one or more layers 318 in an expanded state may comprise of one or more of fully extracted, partially extracted, or unextracted files.

One or more files may be extracted from a layer, and the one or more extracted files may each have a file identifier 306a. A file checksum 308a may be computed for the extracted files, and the extracted files may be located by a file path 310a. For example, the container image layer may be a layer of a webmail application container image, and the image layer may be comprised of one or more files each having a checksum.

Referring to the extracted container image layer shown in FIG. 3, a first layer may be identified as "layer1.gz." As the ".gz" extension of "layer1.gz" suggests, a layer may be archived, compressed, or both. Layers may be dearchived and/or decompressed to extract the files in the layer. The files themselves may be archived and/or compressed, and these too may be dearchived and/or decompressed to extract more files. The extracted files may have one or more identifiers 306a. For example, the extracted image layer shown in FIG. 3 illustrates that "layer1.gz" includes four files, identified by file identifiers 306a as "package1.pkg," "websrv.exe," "svc3.exe," and "readme.txt." Thus, the extracted files may be of any type, and in any format.

A checksum may be computed for each extracted file using, for example, a hashing algorithm such as MD5. For instance, the file checksum 308a for "package1.pkg" may be "sa1j6k8d4sa1c," while the checksum 308a for "websrv.exe" may be "mc4h39ikle8sh," and so forth as illustrated in the container image layer in FIG. 3. The checksums of the extracted files may be looked up and compared against the checksums of the file paths of the various image repositories. For example, as shown in FIG. 3, the checksum of the extracted file "svc3.exe" is "18anxha482hjk." This checksum matches with the checksum in the file path of the file in or associated with the Operating System Services repository at "/var/lib/containers/storage/ostree/os-svcs/18anxha482hjk." In other words, the extracted "svc3.exe" file with checksum "18anxha482hjk" already exists on the data storage device in the Operating System Services repository, and the extracted file is a duplicate.

Rather than duplicating the file data of the extracted file, a link may be created instead in one location or repository pointing to the file in or associated with another location or repository. In some examples, the link has the same file name (e.g., "svc3.exe") as the target file in another repository. In other examples, the link has the file name of the checksum of the target file. In further examples, both the link and the target file are named (or renamed) as a checksum of the target file (e.g., 18anxha482hjk).

The files of the image layer may be extracted to a file path 310a. The file path may be any file path on a local data storage device, a network data storage device, cloud data storage, etc. The file path exemplified by file path 310a is a local file path, "/var/lib/containers/storage/wmapp/layer1/," indicating that the files have been extracted to a first layer ("layer1") of a webmail application ("wmapp") in a "storage" repository.

Files may be "moved" from one file path to another, i.e., from one image to another, from one image layer to another, from one repository to another, etc. Referring to the example shown in FIG. 3, if the file checksums 308a of three of the four extracted files (sa1j6k8d4sa1c, mc4h39ikle8sh, na15hj12s1a47) of "layer1.gz" could not be found in any file path accessible to the system, then those three extracted files may be "moved" from the "/var/lib/containers/storage/wmapp/layer1" file path and "placed" into new file paths in an appropriate repository. For example, if the extracted files were extracted from an application image, then an appropriate place to which to store or move the files may be the Applications repository 316. Then, the data in the extracted files may be accessed via their respective file paths in the Applications repository 316, e.g., "/var/lib/containers/storage/ostree/apps/sa1j6k8d4sa1c/," "/var/lib/containers/storage/ostree/apps/mc4h39ikle8 sh/," and "/var/lib/containers/storage/ostree/apps/na15hj12s1a47/" respectively. The "move" may be accomplished in a number of ways. In some examples, new hard links are created in the Applications repository 316 and the previous links in the "/var/lib/containers/storage/wmapp/layer1" file path are removed. In some examples, the extracted files are copied into the Applications repository, new links are created using the file names in the "layer1" file path pointing to the copied files in the Applications repository, and the data of the extracted files is deleted. In some examples, the extracted files are "cut" from the "layer1" file path and "pasted" into the Applications repository. Any method to "move" a file from one file path to another may be used.

As shown in FIG. 3, layer 318 illustrates three files "sa1j6k8d4sa1c," "mc4h39ikle8sh," and "na15hj12s1a47"

and their respective file paths. These files may have been copied or moved from the file path 310a of the extracted files to the file paths as shown in layer 318. In some examples, such as shown in layer 318, files may be renamed as, or additionally identified by, their checksums.

Layer 318 may also include a link to another container image repository. As shown, a link was created in layer 318 for the file previously identified as "svc3.exe" with file checksum 308a "18anxha482hjk." As described with respect to FIGS. 1 and 2, the checksums 308a of the extracted files are matched with file paths, such as those shown in layers 314 and 318 of their respective repositories. Generally, a good place to start the checksum lookup or matching would be at the repository where the type of file is expected to be found. If the file is not found in that repository, the lookup may extend to other repositories.

In response to a checksum match, a link may be created to the particular file corresponding to the matching checksum. As shown in FIG. 3, the checksum "18anxha482hjk" matches with the file path "/var/lib/containers/storage/ostree/os-svcs/18anxha482hjk." The file path indicates that the matching file is located in or associated with repository 312 for operating system services. Like repository 316, the repository 312 for operating system services may also include one or more layers 314 in an expanded state. As shown, the layer 314 includes four files, a first file "41s32dfw1979," a second file "b473605rx7084," a third file "18anxha482hjk," and a fourth file "ct9aeg6fd3sfe." Here, the checksum of the third file in layer 314 is identical to the checksum "18anxha482hjk" of the extracted file "svc3.exe." Thus, if an image in a repository such as an Applications repository 316 requires access to the file with checksum "18anxha482hjk," a link pointing to the location or repository where the file may be located may be created in the image requiring access to the file, such that the file may be accessed via the link.

The link may itself be a file. However, the linking file (e.g., "18anxha482hjk") associated with the image requiring access (e.g., an application image in the Applications repository) may not contain the data of the executable file, but merely be a link to the "18anxha482hjk" file in another repository, such as the Operating System Services repository (e.g., "/var/lib/containers/storage/ostree/os-svcs/18anxha482hjk"). The target file (e.g., "18anxha482hjk") in the other repository (e.g., Operating System Services) may itself be another link, i.e., it may point to another file directly associated with the data. Thus, a link is created for a linking file at a linking image repository (e.g., the Application repository) to a target file at a target image repository (e.g., the Operating System Services repository), using the file path of the target file at the target image repository (e.g. "/var/lib/containers/storage/ostree/os-svcs/18anxha482hjk"). In some examples, the first and second image repositories are the same, which may be the case when the file already exists (in another image or image layer) on the image repository where the file should be stored. In such cases, a link may be placed in similar fashion as described above in the new image or new image layer. The link would similarly point back to the already existing file in the other image or image layer in the same repository.

As shown by the container image layer identified as "layer1.gz" by layer identifier 302b, which is in a post-extraction, post-linked state, extracted files may be deleted after the linking. Specifically, the extracted file which checksum had matched with a file path may be deleted after the link is created to the target file at the matched file path. Layer identifier 304b, file identifier 306b, and file checksum 308b are analogous to layer identifier 304a, file identifier 306a, and file checksum 308a described earlier, and will therefore not be described further here. Deletion may include marking the corresponding logical blocks, sectors, segments, portions or units of memory for overwriting by new data. Deletion may also include removal of all links to the unit of memory. Thus, deletion allows the portion of the memory previously reserved for the extracted file to be freed up.

Additionally, if the extracted files which checksums did not match with any file paths were copied or moved into their relevant repositories, a link may be placed and maintained in the original extraction location pointing to their new locations using their new file paths. For example, the extracted file "package1.pkg" originally located at the extraction location ("storage" repository) "/var/lib/containers/storage/wmapp/layer1/" may be moved to the Applications repository "/var/lib/containers/storage/ostree/apps/sa1j6k8d4sa1c." A link may be placed and maintained in "/var/lib/containers/storage/wmapp/layer1/" pointing to the file paths 310b of the target files. The target files may be the moved files, or the files which had file paths with matching checksums as the extracted files.

Figure 4:
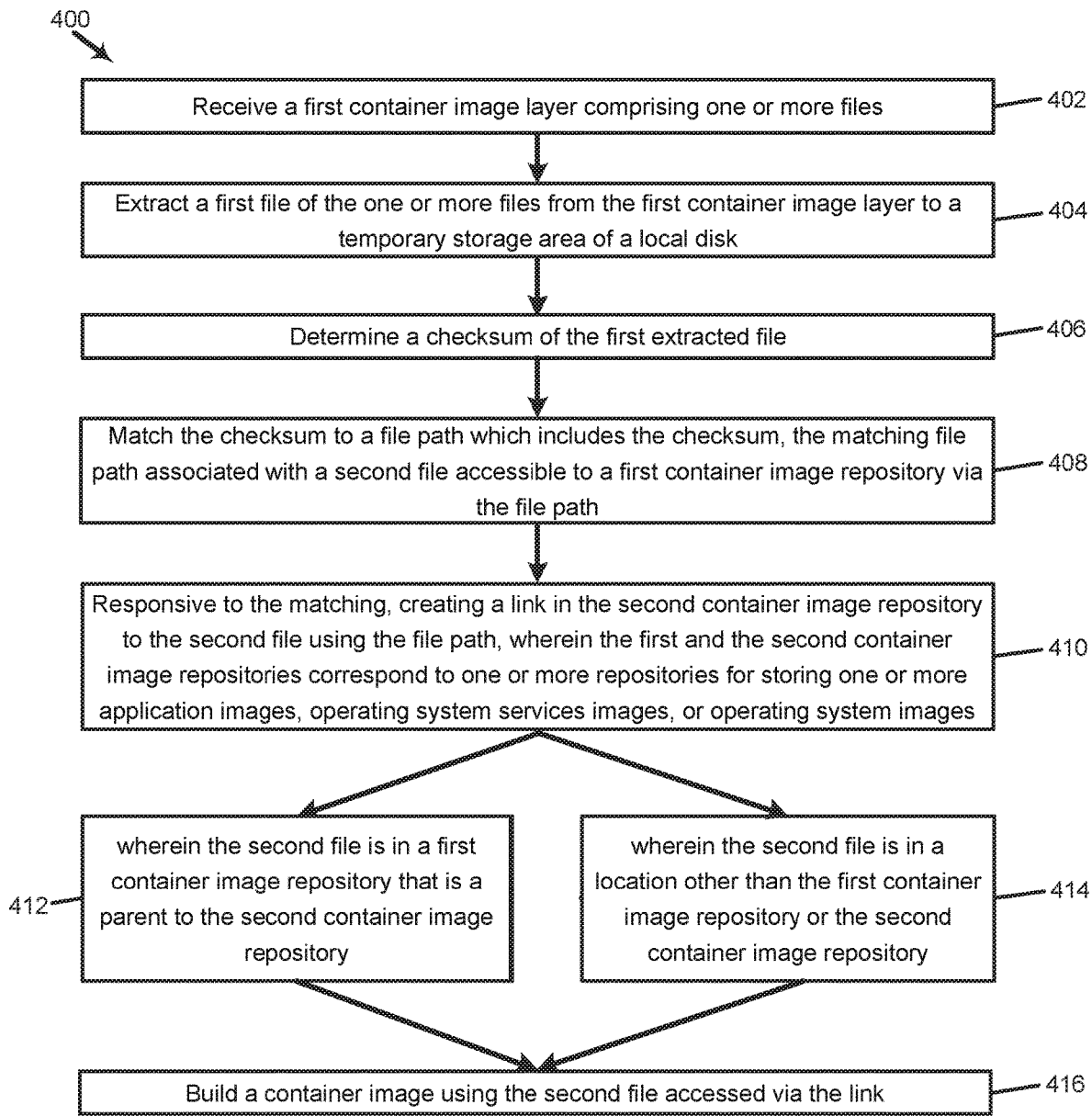
FIG. 4 is a flow diagram illustrating a method for matching a file's checksum to a file path and creating a link in a container image repository to the file at the file path, in accordance with various examples of the present disclosure.

FIG. 4 is a flow diagram illustrating a method for matching a file's checksum to a file path and creating a link in a container image repository to the file at the file path, in accordance with various examples of the present disclosure. The method 400 may be performed by non-transitory memory and processors. The non-transitory memory and processors may be provided, for example, by the system 100 described with respect to FIG. 1. Additional steps may be provided before, during, and after the steps of method 400, and some of the steps described may be replaced, eliminated and/or re-ordered for other examples of the method 400. For example, files may be stored in a first or second repository, or in any other location, prior to the steps of method 400. The files may have a pre-determined checksum, and the file paths of the files may include the pre-determined checksum. The pre-determined checksum in the file path may turn out to be the same as a later-determined checksum of a later-extracted file. Method 400 may also include additional steps, such as building a container image using a file accessed via a link created by the method 400. Method 400 may be performed, for example, in combination with the steps of method 200 described with respect to FIG. 2. Method 400 may also be performed using one or more container image layers 314 and 318 in an expanded state, and other elements described with respect to FIG. 3. In some examples, method 400 may be performed by one or more computer systems described with respect to FIG. 1, acting in concert or individually.

At action 402, a first container image layer comprising one or more files is received. The image layer may contain any number of files, and the files may be in any format.

At action 404, a first file of the one or more files of the container image layer is extracted. Any number of files may be extracted, and the files may be extracted to any location, including a temporary storage area of a local disk. The temporary storage area may be periodically purged to remove unused extracted files. The period may be fixed (e.g., every day, every week, every month, etc.), event-based (e.g., when temporary storage consumes a certain storage amount or proportion of storage), or dynamic (e.g., maximum temporary storage capacity may increase or decrease depending on usage of the rest of the storage).

At action 406, a checksum of the first extracted file is determined. The checksum can be determined using any suitable algorithms, such as the MD5 hashing algorithm described with respect to FIG. 1.

At action 408, a match is performed to match the checksum of the first extracted file to a file path which includes the checksum, the file path associated with a second file accessible to a first container image repository via the file path. The checksum may be of any length, and the matching may be performed using any matching criteria, including those described with respect to FIG. 1.

For example, the extracted file may have a checksum "18anxha482hjk." The file path of an Operating System Services repository may be "/var/lib/containers/storage/ostree/os-svcs/18anxha482hjk." The file path is associated with the second file "18anxha482hjk" and is accessible to the Operating System Services via the file path.

In some examples, the match is performed by a lookup function. In some examples, lookups are performed according to the type of image from which the files are extracted and the hierarchy of the target repository where the link of action 410, described below, would likely be placed, or where the extracted file would likely be stored if the file path lookup yielded no results. For example, if the pulled image from which the file was extracted was an application image, then a natural or appropriate place to store the extracted file would be in the Applications repository. The various types of image may be, for example, application image type, operating system services image type, or operating system image type. According to a hierarchical lookup sequence, the target repository is searched first, followed by a first parent of the target repository, a first grandparent, and so forth. Siblings may also be searched at each tier before a higher tier in the hierarchy is searched.

At action 410, responsive to the matching, a link is created in a second container image repository (e.g., the Applications repository) to the second file using the file path. The link may be created in an image layer of the second repository. Creating a link to an existing file-rather than creating a copy of the file—may save significant storage space. Thus, if the extracted file already exists in the Operating System Services repository, a link would be placed in the Applications repository (or any other appropriate repository), and the link would point to the existing file in the Operating Systems Repository. The link would not contain the data of the extracted file, and may be just a few bytes or kilobytes in size as it would essentially only contain some metadata. The link may be a hard link, a soft link, a symbolic link, an alias, or any other type of link.

Continuing with the examples above, a link to the file with the checksum "18anxha482hjk" may be placed in the Applications repository using the file path "/var/lib/containers/storage/ostree/os-svcs/18anxha482hjk". The link may be a file containing metadata identical to the extracted file or the linked file, such as an identical file name, but which may not contain the data "payload" of the extracted file or the linked file.

Branch 412 illustrates that the second file of action 408 is in a first container image repository, and the first container image repository is a parent to the second container image repository. For example, the first repository may be an Operating System Services repository, which may be a parent to a second repository such as an Applications repository. In some examples, a file being "in" a container image repository means that the file includes the data payload. In other examples, it means that the file is associated with the container image repository it is in. In further examples, it means that the file is linked to the container image repository it is in.

Branch 414 illustrates that a storage location of the second file of action 408 is in a location other than the first or the second container image repositories. For example, the second file may be in a general storage location not defined or classified as a container image repository, a temporary storage location, an unclassified storage location, etc. The second file need not be located in any particular repository, and its location need not be hierarchically related to any particular repository, to be accessible to the first repository of action 408. The second file may be accessible to any repository via links, such as hard links, soft links, symbolic links, aliases, or any other type of link including network links. For example, a hard link pointing to the second file may be placed in a repository to grant the repository access to the second file.

At action 416, a container image is built using the second file accessed via the link. In some examples, no copies of the data payload of the second file are made in the built container image.

What is claimed is:

1. A system comprising:
a non-transitory memory; and
one or more hardware processors coupled to the non-transitory memory to execute instructions from the non-transitory memory to perform operations comprising:
determining a checksum for a container image file;
storing the file at a file path that uses the checksum as part of the alphanumeric string identifying the file path;
receiving a first container image layer comprising one or more files;
extracting a first file of the one or more files from the first container image layer;
determining a checksum of the first extracted file;
matching the checksum of the first extracted file to the file path which includes the checksum as part of the alphanumeric string identifying the file path, the file path associated with the container image file, which is accessible to a first container image repository via the file path; and
responsive to the matching, creating a link in a second container image repository to the container image file using the file path.

2. The system of claim 1, wherein a location for the extracting includes a temporary storage area of a local disk.

3. The system of claim 1, wherein the container image file is in a first container image repository.

4. The system of claim 3, wherein the first container image repository includes a parent of the second container image repository.

5. The system of claim 1, wherein the container image file is in a location other than the first container image repository or the second container image repository.

6. The system of claim 1, wherein the first container image repository and the second container image repository each correspond to one or more container image repositories for storing one or more application container images, operating system services container images, or operating system container images.

7. The system of claim 1, further comprising deleting the first extracted file after the creating of the link.

8. The system of claim 1, wherein one or more of the first container image repository and the second container image repository includes one or more container image layers stored in an expanded state.

9. The system of claim 1, further comprising after the creating of the link, building a container image using the container image file accessed via the link.

10. A method comprising:
   determining a checksum for a container image file;
   storing the file at a file path that uses the checksum as part of the alphanumeric string identifying the file path;
   receiving a first container image layer comprising one or more files;
   extracting a first file of the one or more files from the first container image layer;
   determining a checksum of the first extracted file;
   matching the checksum of the first extracted file to the file path which includes the checksum as part of the alphanumeric string identifying the file path, the file path associated with the container image file accessible to a first container image repository via the file path; and
   responsive to the matching, creating a link in a second container image repository to the container image file using the file path.

11. The method of claim 10, wherein the container image second file is stored in a first container image repository.

12. The method of claim 10, wherein the first container image repository includes a parent of the second container image repository.

13. The method of claim 10, wherein the first container image repository and the second container image repository each correspond to one or more container image repositories for storing one or more application container images, operating system services container images, or operating system container images.

14. The method of claim 10, further comprising deleting the first extracted file after the creating of the link.

15. The method of claim 10, wherein one or more of the first container image repository and the second container image repository includes one or more container image layers stored in an expanded state.

16. A non-transitory machine-readable medium having stored thereon machine-readable instructions executable to cause at least one machine to perform operations comprising:
   determining a checksum for a container image file;
   storing the file at a file path that uses the checksum as part of the alphanumeric string identifying the file path;
   receiving a first container image layer comprising one or more files;
   extracting a first file of the one or more files from the first container image layer;
   determining a checksum of the first extracted file;
   matching the checksum to the file path which includes the checksum as part of the alphanumeric string identifying the file path, the file path associated with the container image file accessible to a first container image repository via the file path; and
   responsive to the matching, creating a link in a second container image repository to the container image file using the file path.

17. The non-transitory machine-readable medium of claim 16, wherein the container image file is stored in a first container image repository.

18. The non-transitory machine-readable medium of claim 16, wherein the first container image repository includes a parent of the second container image repository.

19. The method of claim 10, wherein the first container image repository and the second container image repository each correspond to one or more repositories for storing one or more application container images, operating system services container images, or operating system container images.

20. The non-transitory machine-readable medium of claim 16, further comprising deleting the first extracted file after the creating of the link.

* * * * *